Sept. 5, 1961   H. F. STODDART ET AL   2,999,206
METHOD AND APPARATUS FOR MEASURING THE
RATIO OF ELECTRIC POTENTIALS
Filed Oct. 3, 1958

United States Patent Office 2,999,206
Patented Sept. 5, 1961

2,999,206
METHOD AND APPARATUS FOR MEASURING THE RATIO OF ELECTRIC POTENTIALS
Hugh F. Stoddart, South Sudbury, and Eliot Dubois, Lincoln, Mass., assignors to Baird-Atomic, Inc., Cambridge, Mass., a corporation of Massachusetts
Filed Oct. 3, 1958, Ser. No. 765,226
7 Claims. (Cl. 324—140)

This invention relates to electrical circuits for measuring the ratio of two potentials and to the electrical methods involved in such measurements.

In several types of scientific instruments it is necessary to measure the ratio of two electrical potentials, for instance, the ratio of the voltages on two charged capacitors. An example of such an instrument is a direct reading spectrometer in which currents produced by the incidence of selected spectral lines on photocells are integrated by storing the currents in capacitors; these integrated values being subsequently compared by determining the ratios of the voltages of various capacitor pairs.

A circuit useful in such a measurement is disclosed in U.S. Patent No. 2,647,236 issued to Saunderson et al. That circuit utilizes the principle that the time required for the charge on a known value of capacitance to discharge exponentially through a known value of resistance from a higher potential to a lower potential is proportional to the logarithm of the ratio of those two potentials. The time required for that discharge thus gives an indication of the ratio of the two potentials. Although that circuit is suitable for many applications, its accuracy is completely dependent upon the accuracy of the associated frequency standard or similar time measuring equipment. Where a sufficiently precise frequency standard is not available that circuitry cannot be used.

Accordingly, it is an object of this invention to provide an improved circuit adapted to measure the ratio of two potentials and produce directly an accurate indication of that ratio without any dependence upon accurate timing equipment.

Another object of the invention is to provide a circuit whereby the ratio of two potentials may be directly expressed in digital form. Still another object of the invention is to provide a circuit which is simple and rugged and is susceptible to rapid, repetitive operation. A related object is to provide an improved method of measuring potential ratios.

Figure 1:
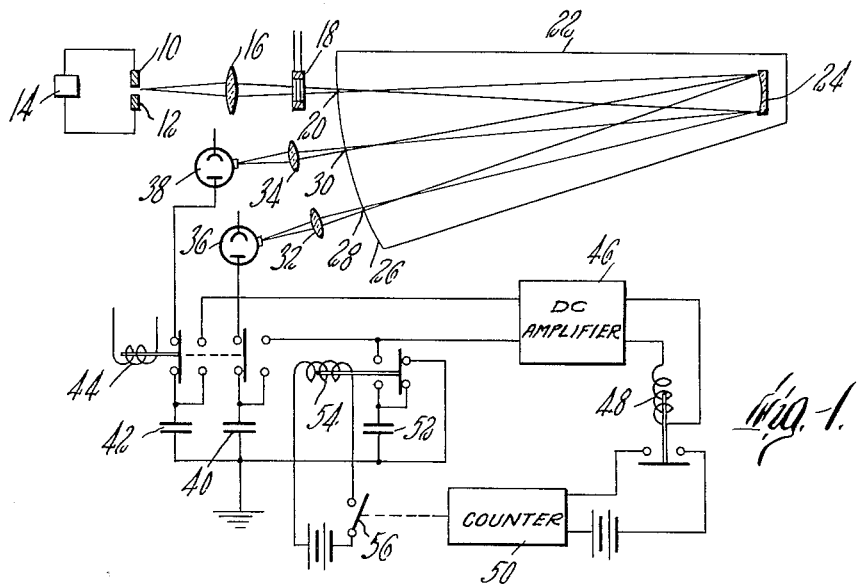
Figure 2:
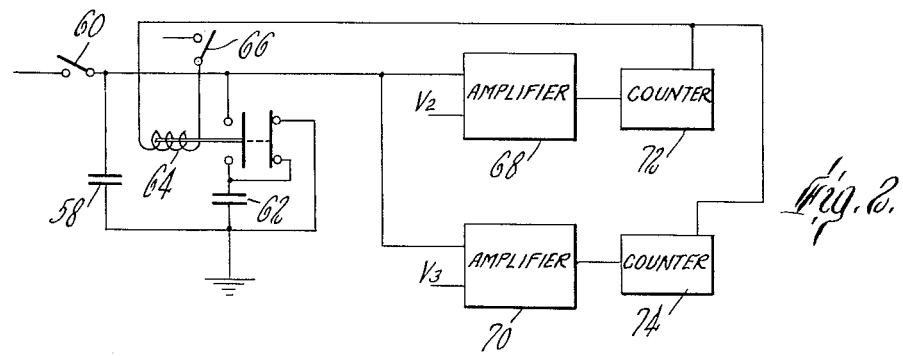
Figure 3:
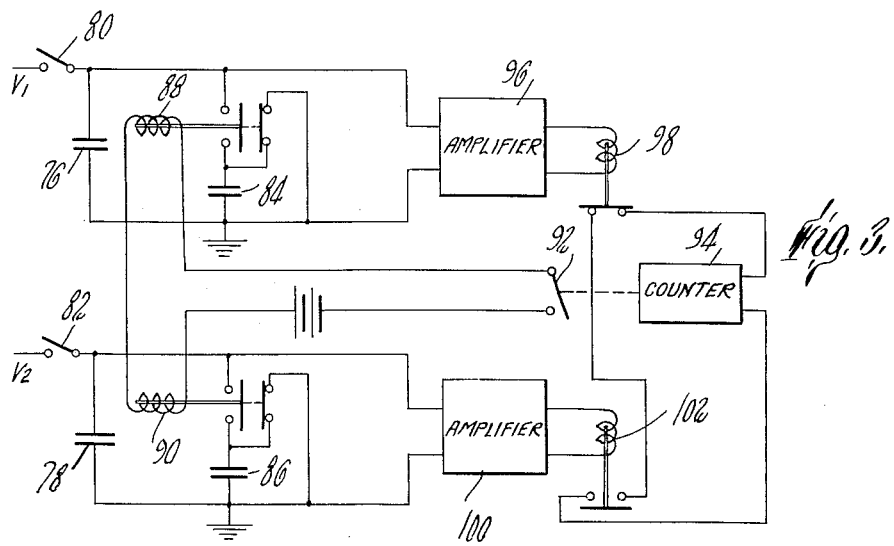

Other objects, features, and advantages of the invention will be apparent from the following description of a preferred embodiment of the invention with reference to the accompanying drawings, in which:

FIG. 1 is a simplified diagram illustrating the measuring circuit according to a preferred embodiment of the invention in conjunction with a spectrometer; and FIGS. 2 and 3 are schematic diagrams of modified circuits according to the invention.

The circuitry according to the invention is adapted to reduce an initial electric charge stored on a capacitor in increments in a manner such that each increment is directly related to the charge of the capacitor just prior to each reduction. When the incremental decreases are sufficiently small the reduction approaches an exponential and the number of increments required to reach a second value of electric charge is directly proportional to the logarithm of the ratio between the initial value and the second value.

In a preferred embodiment the quantity to be determined is the ratio of the electric potentials on two charged capacitors ($C_1$ and $C_2$). The capacitor ($C_1$) charged to the higher potential is paralleled with a discharged capacitor ($C_3$) of much smaller value. By this operation the potential on the charged capacitor is reduced by an amount $$\Delta V = V_0 \left( \frac{C_3}{C_1 + C_3} \right)$$

where $V_0$ is the initial voltage on $C_1$. The paralleled capacitor ($C_3$) is then disconnected, discharged and the operation is repeated until the potential on the charged capacitor ($C_1$) is reduced to a potential on the second capacitor ($C_2$). At that time the discharging process may be terminated.

The instantaneous voltage on capacitor $C_1$ after any discharge may be expressed by the equation:

$$V = V_0 \epsilon - \left( \frac{C_1}{C_1 + C_3} \right) N$$

where N is the number of times the capacitor $C_3$, in discharged condition, has been paralleled with capacitor $C_1$. The number (N) of paralleling operations required to decrease the potential on $C_1$ from the initial potential to the second potential thus is proportional to the logarithm of those two potentials. When a sufficient number of increments occur (assured through a judicious selection of the size of the paralleled capacitor $C_3$) an accurate digital indication of the ratio of the two potentials is obtained.

The use of this invention in conjunction with a spectrometer is illustrated in FIG. 1. Two pieces of the specimen to be analyzed are connected as electrodes 10, 12 across a high voltage source 14. An electric arc, passed between the two pieces, vaporizes a sample of all the elements present in the specimen and causes the resulting atoms and ions to emit light containing wave lengths characteristic of those elements. This light is focused by a lens 16 through an electrically operated shutter 18 onto an entrance slit 20 of the spectrometer 22. The entering light strikes a concave diffraction grating 24, which disperses the light into its component wave lengths and causes the resulting bright line spectrum to be imaged on the focal curve 26 of the instrument. The resulting spectral lines are dependent upon the wave lengths present in the arc. Exit slits 28, 30 are located along the focal curve 26 in positions to allow passage of selected lines corresponding, for example, to an internal reference or matrix element of the sample and to the element for which the sample is being analyzed. These selected lines are focused by lenses 32 and 34 on the light sensitive elements of electron multiplier phototubes 36 and 38 respectively. Potential for the operation of the phototubes is provided by a high voltage source (not shown).

The spectral light falling on each of the photosensitive elements causes a flow of current which is stored in the associated capacitors 40 and 42 respectively. These capacitors are connected in their respective circuits through contacts of relay 44, as shown. The amounts of current and thus the potentials on the capacitors are proportional to the quantities of the two selected elements in the sample.

The arcing of the specimen may continue a predetermined length of time, for example, or until the reference capacitor 40 is charged to a predetermined potential. Upon completion of the arcing of the specimen, the relay 44 is operated to disconnect the capacitors from the phototubes and to connect them in the measuring circuit. In that circuit one terminal of each capacitor is connected to a D.C. amplifier 46 and the other terminal remains grounded. (If desired a standard cell may be utilized in series with one of the capacitors to provide a reference potential for operation of the amplifier). The D.C. amplifier has an output which energizes the coil of the counter latch relay 48 as long as there is an appropriate voltage difference between the input lines to the amplifier. Energization of relay 48 closes its contacts to unlatch (reader operative) and permit stepping of counter 50.

A capacitor 52 is adapted alternately to be discharged and to be connected in parallel to the capacitor 40 by means of relay 54. The size of capacitor 52 is very small in comparison to the size of capacitor 40. For example, capacitor 40 may be one-half microfarad and capacitor 52 may be 500 micro-microfarads. The contacts of relay 54 are a low leakage type of switch, for example, the Clare type No. HG3002 or the Revere "Glaswitch," such that the instantaneous potential on capacitor 40 is accurately dependent on the initial potential and the number of operations of relay 54.

The number of operations of the relay are recorded by suitable means such as an electrical or mechanical counter 50. The relay is energized by the closing of the contacts of a switch 56 and simultaneously the counter is stepped through a suitable mechanical or electrical connection (indicated generally by the dashed line connecting switch 56 to the counter 50). As long as the potential on capacitor 40 is greater than the potential on capacitor 42, the amplifier 46 provides an output which maintains the relay 48 energized and the counter unlatched (rendered responsive to input stepping signals). When the potential on capacitor 40 is reduced to a value equal to or below the potential on capacitor 42, relay 48 is deenergized, latching the counter 50 and rendering it inoperative.

The switch 56 may be operated by any appropriate means, manually or otherwise. The number of operations required to reduce the potential on capacitor 40 to a value equal to the potential on capacitor 42 is recorded by the counter 50. As this method of incremental discharge of the reference capacitor is exponential in nature the number of operations of the switch 56 is proportional to the logarithm of the ratio of the initial potentials on capacitors 40 and 42. This value gives a direct indication in digital form of the quantity of the unknown element relative to the reference element.

Alternatively, the operations of the switch 56 may be utilized to feed a stepping motor which is rotated a predetermined number of degrees by each input pulse. The output shaft of this motor, through appropriate gearing, is connected to a pointer associated with a circular logarithmic scale which is calibrated in the percentage of the unknown element relative to the reference element. Thus the quantity of the unknown element in the material under examination may be read directly.

The invention may, of course, be utilized in many other applications. The percentage of a plurality of elements relative to a matrix element may be measured simultaneously by charging a plurality of capacitors to potentials corresponding to the quantities of various elements in the material to be analyzed, discharging the highest potential (corresponding to the matrix element) in incremental steps, and utilizing individual counter means for recording the number of steps required for that potential to equal the potential associated with each of the other elements. A variation of this technique involves the charging of a capacitor to a voltage higher than any of the unknown potentials and incrementally discharging that capacitor through a known capacitance and recording the number of steps required to equal each of the other potentials.

A suitable circuit for these purposes is shown in FIG. 2. $V_1$, the highest voltage, is impressed on capacitor 58 and then switch 60 is opened. The potential on capacitor 58 is incrementally reduced through the repetitive paralleling with it of an initially discharge capacitor 62 by means of relay 64 operated by switch 66. The differences between the potential of capacitor 58 and $V_2$ and $V_3$ are amplified by amplifiers 68 and 70 respectively. As long as those potential differences exist, the counters 72 and 74 respectively are rendered operative by the amplifier outputs. The operations of relay 64 are recorded by conventional means on the counters. The number of steps required for potential $V_1$ to be reduced to potentials $V_2$ and $V_3$ respectively is proportional to the logarithms of the ratios $$\frac{V_2}{V_1} \text{ and } \frac{V_3}{V_1}$$

The difference in the number of steps recorded on the counters is proportional to the log of the ratio $$\frac{V_2}{V_3}$$

The previously described circuits operate with the discharging of only one capacitor. However, potential ratios may also be measured according to the principles of the invention by utilizing a circuit in which more than one capacitor is allowed to discharge. In such a circuit, the potential ratio is measured by incrementally reducing the charge on each of the capacitors and determining the difference in the number of steps required for the potentials to reach the same predetermined low potential. The difference in the number of steps is a measure of the ratio of the two initial potentials.

A typical circuit is shown in FIG. 3. Capacitors 76 and 78 are charged to potentials $V_1$ and $V_2$ respectively and the associated switches 80 and 82 respectively are then opened. The potentials on the two capacitors are then incrementally reduced by repetitively paralleling them with discharged capacitors 84 and 86 by means of relays 88 and 90 respectively. A single switch 92 is utilized. The counter 94 remains latched until the potential on capacitor 78 is reduced such that amplifier 96 permits relay 98 to become deenergized. Operations of switch 92 are then recorded by the counter until the potential on capacitor 76 is reduced to a value such that amplifier 100 deenergizes relay 102. As both relays 98 and 102 are designed to become deenergized at the same potential, the counter indicates the log of the ratio between potentials $V_1$ and $V_2$.

Thus it will be seen that the invention provides a circuit for the measurement of electric potential ratios. In general, a higher potential is reduced to a lower potential in increments which are a fixed percentage of the instantaneous potential. In the preferred embodiment the higher potential is stored on a large capacitance and that potential is reduced through paralleling that large capacitance with a discharged small capacitance. In this manner the reduction of the potential approaches an exponential curve such that the number of increments required to reduce the higher potential to the lower potential is directly proportional to the logarithm of the ratio of the two voltages. The results are immediately available in digital form and may be displayed directly or in a corresponding logarithmic scale from with the accompanying advantages inherent therein. The accuracy of the apparatus is independent of time as the measurement is achieved by simple paralleling of a discharged capacitor with the charged capacitor to remove a percentage of its charge, and hence it is not dependent upon the availability of a highly accurate frequency standard for time measurement.

While preferred embodiments of the invention have been shown and described herein, the invention is not intended to be limited thereto or to details thereof and departures may be made therefrom within the spirit and scope of the invention as defined in the following claims.

I claim:

1. Apparatus for measuring the ratio of two electric potentials comprising a first capacitor and means to charge said first capacitor to at least the higher of said two potentials, means to incrementally discharge said capacitor such that each increment of discharge is a fixed percentage of the instantaneous potential on said first capacitor and means to count the number of increments required to reduce the potential on said capacitor from the higher to the lower of said two potentials, said number of increments providing a digital indication of the logarithm of the ratio of said two potentials.

2. The apparatus as claimed in claim 1 wherein said means to incrementally discharge said capacitor comprises a second capacitor and means for alternately and repetitively completely discharging said second capacitor and paralleling said second capacitor with said first capacitor such that the potential on said first capacitor is reduced in fixed percentage increments.

3. The apparatus as claimed in claim 2 and further including a D.C. amplifier adapted to sense the difference between the potential on said first capacitor and said lower potential and a relay responsive to the output of said amplifier adapted to render said counting means inoperative when the potential on said first capacitor is reduced to said lower potential.

4. In an apparatus for determining the ratio of two potentials, capacitive means for establishing a potential at least equal to the higher of the two potentials to be measured, a circuit adapted to reduce said established potential in increments, each said increment being proportional to the instantaneous potential on said capacitive means, sensing means responsive to said instantaneous potential for indicating when the potential on said capacitive means equals the second of the two potentials to be measured, and means for counting the number of said increments required to decrease the potential from said higher potential to said lower potential, said number being proportional to the logarithm of the ratio of the two potentials.

5. The apparatus as claimed in claim 4 wherein said sensing means includes an electronic amplifier adapted to follow the reduction of said potential.

6. Apparatus for determining the logarithm of the ratio of two electric potentials, comprising a first capacitor and means for charging said first capacitor to the higher of said two potentials, a discharging circuit for reducing the potential on said first capacitor in percentage increments comprising a second capacitor much smaller than said first capacitor and a switching circuit adapted alternately to discharge said second capacitor and to parallel said second capacitor in discharged condition with said first capacitor, sensing means including a D.C. amplifier responsive to the potential on said first capacitor for indicating when the potential on that first capacitor equals the lower of said two potentials, and means for counting the number of paralleling operations of said switching means required to reduce the potential on said first capacitor to said lower potential, said number being directly proportional to the logarithm of the ratio of said two potentials.

7. The method of measuring the ratio of two electric potentials comprising the steps of charging a first capacitor to the higher of said two potentials, reducing the potential on said first capacitor in increments by repetitively paralleling said first capacitor with a discharged capacitor of substantially smaller value, and counting the number of paralleling operations required to reduce the potential on said first capacitor from the higher to the lower of said two potentials, said number providing a digital indication of the logarithm of the ratio of said two potentials.

References Cited in the file of this patent

UNITED STATES PATENTS

| | | |
|---|---|---|
| 1,830,170 | Lindenblad | Nov. 3, 1931 |
| 2,114,016 | Dimond | Apr. 12, 1938 |
| 2,313,666 | Peterson | Mar. 9, 1943 |
| 2,392,632 | Berry | Jan. 8, 1946 |
| 2,577,815 | Saunderson | Dec. 11, 1951 |
| 2,615,934 | Mackta | Oct. 28, 1952 |
| 2,647,236 | Saunderson | July 28, 1953 |
| 2,781,490 | Mitchell | Feb. 12, 1957 |
| 2,897,445 | Goodale | July 28, 1959 |
| 2,919,408 | Brown | Dec. 29, 1959 |